(12) United States Patent
Hayashi et al.

(10) Patent No.: US 12,141,737 B2
(45) Date of Patent: Nov. 12, 2024

(54) VEHICLE, INFORMATION PROCESSING SYSTEM, NON-TRANSITORY STORAGE MEDIUM, AND INFORMATION PROCESSING DEVICE

(71) Applicant: TOYOTA JIDOSHA KABUSHIKI KAISHA, Toyota (JP)

(72) Inventors: Masatoshi Hayashi, Nisshin (JP); Josuke Yamane, Nagoya (JP); Daigo Fujii, Nagoya (JP); Yuki Tatsumoto, Seto (JP); Takurou Sakai, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 17/974,621

(22) Filed: Oct. 27, 2022

(65) Prior Publication Data

US 2023/0196260 A1 Jun. 22, 2023

(30) Foreign Application Priority Data

Dec. 22, 2021 (JP) .................................. 2021-208735

(51) Int. Cl.
*G06Q 10/0832* (2023.01)
*B60W 60/00* (2020.01)
(Continued)

(52) U.S. Cl.
CPC ... *G06Q 10/0832* (2013.01); *B60W 60/00256* (2020.02); *G06F 16/9554* (2019.01);
(Continued)

(58) Field of Classification Search
CPC .......... G06Q 10/0832; G06Q 10/0833; G06Q 50/30; G06F 16/9554; B60W 60/00256; G06V 20/56
See application file for complete search history.

(56) References Cited

U.S. PATENT DOCUMENTS 9,864,967 B2 * 1/2018 Shucker ........... G06K 19/06037
10,241,516 B1 * 3/2019 Brady ................ G06Q 10/0832
(Continued)

FOREIGN PATENT DOCUMENTS

JP 2020-181287 A 11/2020
KR 20160146244 A * 12/2016
(Continued)

OTHER PUBLICATIONS

Heather Reinblatt, The Best Proof of Delivery App in 2024: 7 Options Reviewed, Aug. 26, 2020, https://getcircuit.com/teams/blog/proof-of-delivery-app (Year: 2020).*
(Continued)

*Primary Examiner* — Shannon S Campbell
*Assistant Examiner* — Reem Saif
(74) *Attorney, Agent, or Firm* — Dinsmore & Shohl LLP

(57) ABSTRACT

A vehicle configured to autonomously deliver a package includes a control unit configured to acquire designation information generated along with designation by a user about an unattended delivery location for delivery of the package, and drive the vehicle to place the package at the unattended delivery location designated by the user when the unattended delivery location is identified by verifying the unattended delivery location based on the acquired designation information.

15 Claims, 10 Drawing Sheets

(51) Int. Cl.
 *G06F 16/955* (2019.01)
 *G06Q 10/0833* (2023.01)
 *G06Q 50/40* (2024.01)
 *G06V 20/56* (2022.01)

(52) U.S. Cl.
 CPC ......... *G06Q 10/0833* (2013.01); *G06Q 50/40* (2024.01); *G06V 20/56* (2022.01)

(56) References Cited

U.S. PATENT DOCUMENTS

| | | | |
|---|---|---|---|
| 11,353,892 B2 * | 6/2022 | Schubert | G08G 5/025 |
| 2006/0202009 A1 * | 9/2006 | Austin | G06Q 10/08 235/375 |
| 2015/0120094 A1 * | 4/2015 | Kimchi | G06Q 10/083 701/3 |
| 2018/0088586 A1 * | 3/2018 | Hance | G06Q 10/08 |
| 2018/0350021 A1 * | 12/2018 | Pedawi | G06Q 10/083 |
| 2020/0339161 A1 | 10/2020 | Otaki et al. | |

FOREIGN PATENT DOCUMENTS

| | | | | |
|---|---|---|---|---|
| KR | 20200022670 A | * | 3/2020 | |
| WO | WO-2021124826 A1 | * | 6/2021 | B64D 45/04 |

OTHER PUBLICATIONS

Yper Inc., Starting experiment of Yper Corp., Press Release Yper, Autonomous Travel Distribution Robot "LOMBY", Oct. 19, 2021, Internet URL: https://www.yper.co.jp/20211019/2731/ (Partial English translation of Office Action issued Sep. 3, 2024, to corresponding Japanese Patent Appl. No. 2021-208735 attached for relevance of citation).

* cited by examiner

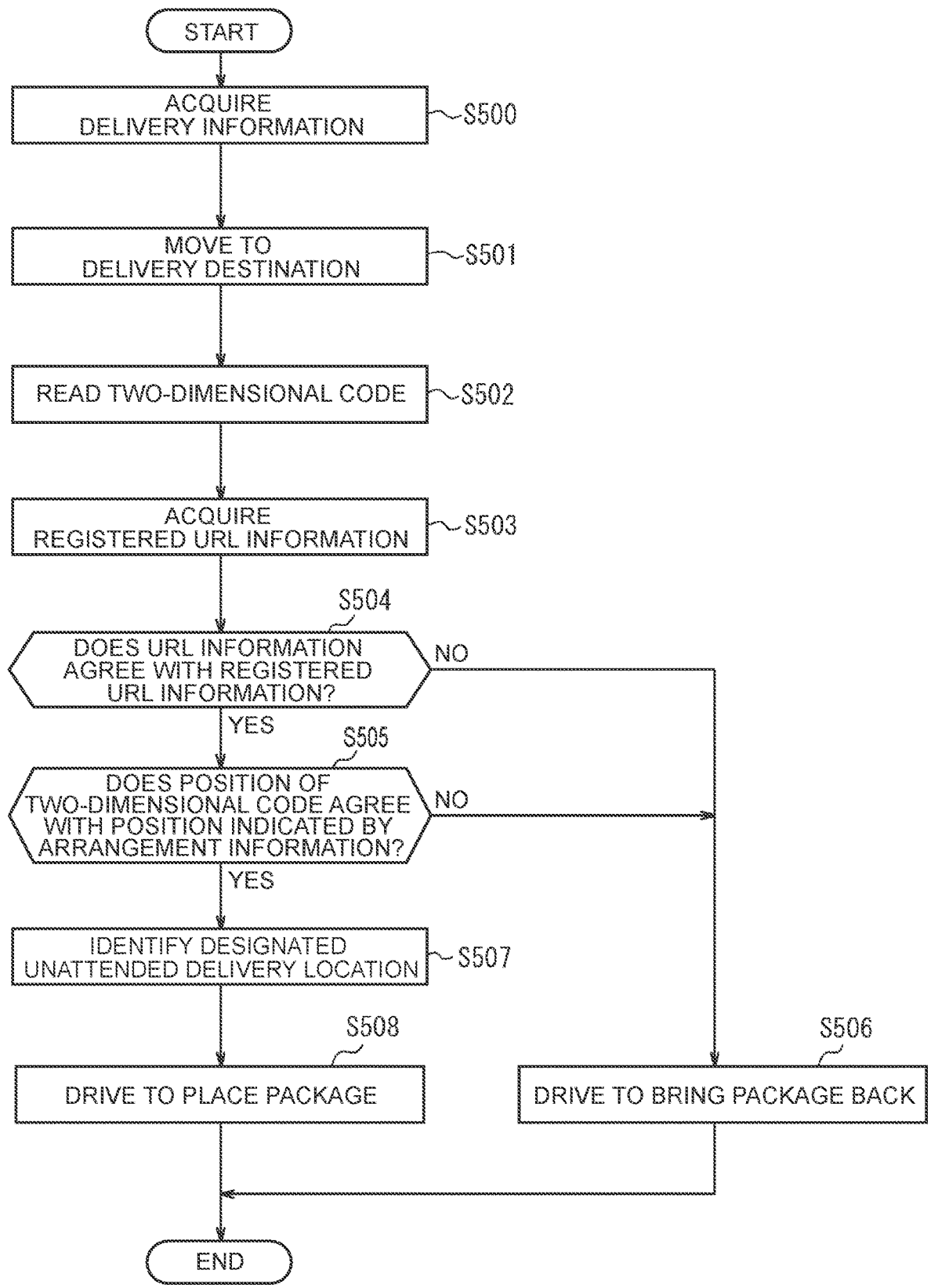

VEHICLE, INFORMATION PROCESSING SYSTEM, NON-TRANSITORY STORAGE MEDIUM, AND INFORMATION PROCESSING DEVICE

CROSS-REFERENCE TO RELATED APPLICATION

This application claims priority to Japanese Patent Application No. 2021-208735 filed on Dec. 22, 2021, incorporated herein by reference in its entirety.

BACKGROUND

1. Technical Field

The present disclosure relates to a vehicle, an information processing system, a storage medium, and an information processing device.

2. Description of Related Art

Hitherto, there is known a technology for automatically delivering a package by using an autonomous driving vehicle. For example, Japanese Unexamined Patent Application Publication No. 2020-181287 (JP 2020-181287 A) discloses an autonomous driving delivery system that presents a package delivery location to a user more appropriately. Such an autonomous driving delivery system determines a first candidate delivery location or a second candidate delivery location as a delivery location, and presents the determined delivery location to the user before the autonomous driving vehicle starts delivering a package toward the determined delivery location.

SUMMARY

In the related art, however, consideration has not sufficiently been given to, for example, unattended delivery when the user cannot receive a package because the user is not at home. It is desirable to leave the package accurately at a location desired by the user.

The present disclosure provides a technology for leaving a package accurately at a location desired by a user.

A vehicle according to one embodiment of the present disclosure is a vehicle configured to autonomously deliver a package. The vehicle includes a control unit configured to acquire designation information generated along with designation by a user about an unattended delivery location for delivery of the package, and drive the vehicle to place the package at the unattended delivery location designated by the user when the unattended delivery location is identified by verifying the unattended delivery location based on the acquired designation information.

In the vehicle according to the embodiment of the present disclosure, the designation information may include information on a specific position designated by an input operation of the user in an image on an application installed in a terminal device of the user.

In the vehicle according to the embodiment of the present disclosure, the designation information may include information on a specific position designated by an input operation of the user in an image captured by a terminal device of the user.

The vehicle according to the embodiment of the present disclosure may further include an imaging unit configured to image surroundings of the vehicle. The control unit may be configured to verify the unattended delivery location by comparing an image captured by using the imaging unit and the information on the designated specific position.

In the vehicle according to the embodiment of the present disclosure, the designation information may include uniform resource locator information readable from a two-dimensional code arranged at the unattended delivery location by the user. The control unit may be configured to verify the unattended delivery location by comparing the uniform resource locator information and registered uniform resource locator information that is preregistered when designating the unattended delivery location and is associated with the two-dimensional code.

In the vehicle according to the embodiment of the present disclosure, the designation information may include arrangement information indicating a specific arrangement location of the two-dimensional code and readable from the two-dimensional code. The control unit may be configured to, when the control unit determines that a position of the two-dimensional code does not agree with a position indicated by the arrangement information, drive the vehicle to bring the package back without leaving the package.

The vehicle according to the embodiment of the present disclosure may further include an acquisition unit configured to acquire position information of the vehicle. The designation information may include coordinate information designated by an input operation of the user on an application installed in a terminal device of the user. The control unit may be configured to verify the unattended delivery location by comparing the position information acquired by using the acquisition unit and the designated coordinate information.

An information processing system according to one embodiment of the present disclosure includes the vehicle according to the embodiment of the present disclosure, and a terminal device to be used by the user who is expected to receive the package delivered by the vehicle and configured to generate the designation information.

A storage medium according to one embodiment of the present disclosure is a storage medium storing instructions that are executable by one or more processors and that cause the one or more processors to perform functions. The functions include acquiring, by a vehicle configured to autonomously deliver a package, designation information generated along with designation by a user about an unattended delivery location for delivery of the package, verifying the unattended delivery location based on the acquired designation information, identifying the unattended delivery location designated by the user by verifying the unattended delivery location, and driving the vehicle to place the package at the unattended delivery location when the unattended delivery location is identified.

In the storage medium according to the embodiment of the present disclosure, the designation information may include information on a specific position designated by an input operation of the user in an image on an application installed in a terminal device of the user.

In the storage medium according to the embodiment of the present disclosure, the designation information may include information on a specific position designated by an input operation of the user in an image captured by a terminal device of the user.

In the storage medium according to the embodiment of the present disclosure, the verifying the unattended delivery location may include comparing the information on the designated specific position and an image captured by using an imaging unit of the vehicle that is configured to image surroundings of the vehicle.

In the storage medium according to the embodiment of the present disclosure, the designation information may include uniform resource locator information readable from a two-dimensional code arranged at the unattended delivery location by the user. The verifying the unattended delivery location may include comparing the uniform resource locator information and registered uniform resource locator information that is preregistered when designating the unattended delivery location and is associated with the two-dimensional code.

In the storage medium according to the embodiment of the present disclosure, the designation information may include coordinate information designated by an input operation of the user on an application installed in a terminal device of the user. The verifying the unattended delivery location may include comparing the designated coordinate information and position information of the vehicle that is acquired by using an acquisition unit of the vehicle that is configured to acquire the position information.

An information processing device according to one embodiment of the present disclosure is an information processing device communicably connected to a vehicle configured to autonomously deliver a package. The information processing device includes a control unit configured to acquire designation information generated along with designation by a user about an unattended delivery location for delivery of the package, and drive the vehicle to place the package at the unattended delivery location designated by the user when the unattended delivery location is identified by verifying the unattended delivery location based on the acquired designation information.

In the information processing device according to the embodiment of the present disclosure, the designation information may include information on a specific position designated by an input operation of the user in an image on an application installed in a terminal device of the user.

In the information processing device according to the embodiment of the present disclosure, the designation information may include information on a specific position designated by an input operation of the user in an image captured by a terminal device of the user.

In the information processing device according to the embodiment of the present disclosure, the control unit may be configured to verify the unattended delivery location by comparing the information on the designated specific position and an image captured by using an imaging unit of the vehicle that is configured to image surroundings of the vehicle.

The information processing device according to the embodiment of the present disclosure may further include a storage unit. The designation information may include uniform resource locator information readable from a two-dimensional code arranged at the unattended delivery location by the user. The control unit may be configured to verify the unattended delivery location by comparing the uniform resource locator information and registered uniform resource locator information that is prestored in the storage unit when designating the unattended delivery location and is associated with the 20 two-dimensional code.

In the information processing device according to the embodiment of the present disclosure, the designation information may include coordinate information designated by an input operation of the user on an application installed in a terminal device of the user. The control unit may be configured to verify the unattended delivery location by comparing the designated coordinate information and position information of the vehicle that is acquired by using an acquisition unit of the vehicle that is configured to acquire the position information.

With the vehicle, the information processing system, the storage medium, and the information processing device according to the embodiments of the present disclosure, it is possible to leave the package accurately at the location desired by the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a flowchart illustrating a third example of the information processing method to be executed by the vehicle in FIG. 1.

DETAILED DESCRIPTION OF EMBODIMENTS

An embodiment of the present disclosure will be described below with reference to the drawings.

Figure 1:
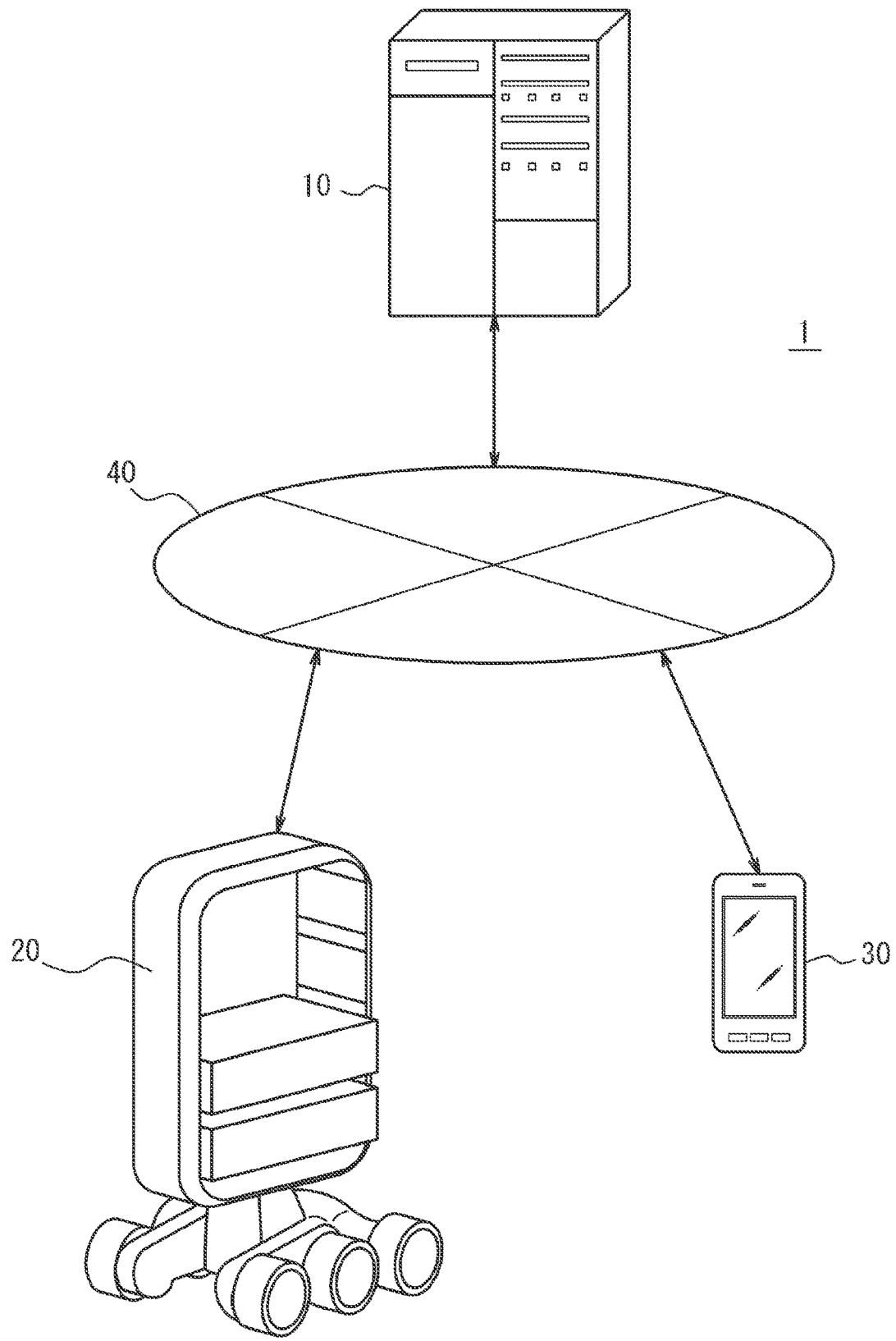
FIG. 1 is a configuration diagram showing a configuration of an information processing system including a vehicle according to one embodiment of the present disclosure.

FIG. 1 is a configuration diagram showing a configuration of an information processing system 1 including a vehicle 20 according to the embodiment of the present disclosure. An outline of the information processing system 1 including the vehicle 20 according to the embodiment of the present disclosure will mainly be described with reference to FIG. 1. The information processing system 1 includes an information processing device 10 and a terminal device 30 in addition to the vehicle 20.

For convenience of description, FIG. 1 shows a single vehicle 20. However, the number of vehicles 20 in the information processing system 1 may be two or more. For convenience of description, FIG. 1 shows a single information processing device 10 and a single terminal device 30. However, the numbers of information processing devices 10 and terminal devices 30 in the information processing system 1 may be two or more. The information processing device 10, the vehicle 20, and the terminal device 30 are communicably connected to a network 40 including, for example, a mobile communication network and the Internet.

The information processing device 10 is a single server device or a plurality of mutually communicable server devices. The information processing device 10 is not limited to the above, and may be any general-purpose electronic device such as a personal computer (PC) or a smartphone, or may be another electronic device dedicated to the information processing system 1.

The vehicle 20 includes any electrified vehicle that moves between locations by autonomous driving. Examples of the vehicle 20 include a small-sized unmanned delivery vehicle that autonomously delivers a package. The vehicle 20 is not limited to this example, and may include any manned electrified vehicle that travels autonomously.

The vehicle 20 autonomously delivers a package to at least one delivery destination. When arriving at the delivery destination, the vehicle 20 passes, to a user who is a recipient at the delivery destination, the package addressed to this user. When the package cannot directly be passed to the user at the delivery destination due to, for example, absence, the vehicle 20 places the package at a location designated by the user or brings the package back as needed without placing the package.

The terminal device 30 is a general-purpose electronic device such as a PC or a smartphone. Examples of the terminal device 30 include an electronic device to be used by a user who receives a package delivered by the vehicle 20. The terminal device 30 is not limited to this example, and may be a single server device or a plurality of mutually communicable server devices to be used by the user who receives a package delivered by the vehicle 20, or may be an electronic device dedicated to the information processing system 1.

As an outline of one embodiment, the vehicle 20 autonomously delivers a package. The vehicle 20 acquires designation information generated along with designation by the user about an unattended delivery location for delivery of a package. The "unattended delivery" herein means that, when a user at a delivery destination cannot directly receive a package due to, for example, absence, the vehicle 20 completes delivery by placing the package at a location designated by the user. The "designation information" includes, for example, any information that allows the vehicle 20 to identify the unattended delivery location designated by the user at the time of unattended delivery of the package. When the vehicle 20 identifies the unattended delivery location designated by the user by verifying the unattended delivery location based on the acquired designation information, the vehicle 20 places the package at the unattended delivery location.

Figure 2:
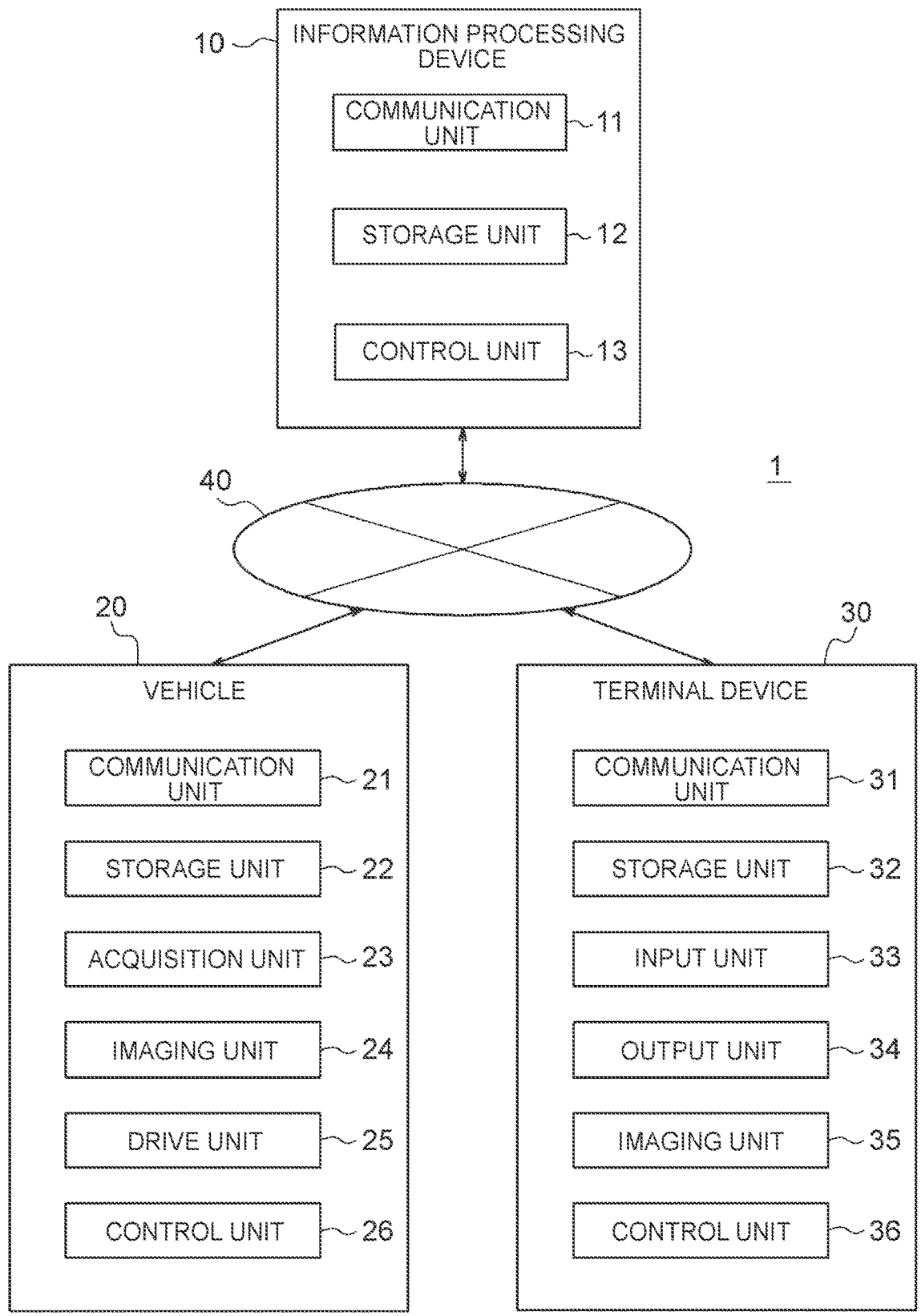
FIG. 2 is a functional block diagram showing schematic configurations of an information processing device, the vehicle, and a terminal device shown in FIG. 1.

FIG. 2 is a functional block diagram showing schematic configurations of the information processing device 10, the vehicle 20, and the terminal device 30 shown in FIG. 1. Referring to FIG. 2, description will mainly be given about an example of the configurations of the information processing device 10, the vehicle 20, and the terminal device 30 in the information processing system 1.

As shown in FIG. 2, the information processing device 10 includes a communication unit 11, a storage unit 12, and a control unit 13.

The communication unit 11 includes a communication module connected to the network 40. For example, the communication unit 11 includes a communication module conforming to mobile communication standards such as the fourth generation (4G) and the fifth generation (5G) or the Internet standards. In one embodiment, the information processing device 10 is connected to the network 40 via the communication unit 11. The communication unit 11 transmits and receives various types of information via the network 40.

Examples of the storage unit 12 include, but are not limited to, a semiconductor memory, a magnetic memory, and an optical memory. The storage unit 12 functions as a main storage device, an auxiliary storage device, or a cache memory. The storage unit 12 stores any information to be used for operation of the information processing device 10. The storage unit 12 stores, for example, various types of information received or transmitted by a system program, an application program, and the communication unit 11. The information stored in the storage unit 12 can be updated by using information received from the network 40 via the communication unit 11.

The control unit 13 includes one or more processors. In one embodiment, the "processor" is a general-purpose processor or a dedicated processor specialized for specific processing. However, the processor is not limited thereto. The control unit 13 is communicably connected to each of the components of the information processing device 10, and controls the overall operation of the information processing device 10.

The configuration of the vehicle 20 in the information processing system 1 will mainly be described. As shown in FIG. 2, the vehicle 20 includes a communication unit 21, a storage unit 22, an acquisition unit 23, an imaging unit 24, a drive unit 25, and a control unit 26. The communication unit 21, the storage unit 22, the acquisition unit 23, the imaging unit 24, the drive unit 25, and the control unit 26 are communicably connected to each other via, for example, a dedicated line.

The communication unit 21 includes a communication module connected to the network 40. For example, the communication unit 21 includes a communication module conforming to mobile communication standards such as 4G and 5G. In one embodiment, the vehicle 20 is connected to the network 40 via the communication unit 21. The communication unit 21 transmits and receives various types of information via the network 40.

Examples of the storage unit 22 include, but are not limited to, a semiconductor memory, a magnetic memory, and an optical memory. The storage unit 22 functions as a main storage device, an auxiliary storage device, or a cache memory. The storage unit 22 stores any information to be used for operation of the vehicle 20. The storage unit 22 stores, for example, various types of information received or transmitted by a system program, an application program, and the communication unit 21. The information stored in the storage unit 22 can be updated by using information received from the network 40 via the communication unit 21.

The acquisition unit 23 includes one or more receivers associated with any satellite positioning system. For example, the acquisition unit 23 includes a global positioning system (GPS) receiver. The acquisition unit 23 acquires a measured value of the position of the vehicle 20 as position information. The position information includes, for example, an address, latitude, longitude, and altitude. The acquisition unit 23 can acquire the position information of the vehicle 20. The acquisition unit 23 may acquire the position information of the vehicle 20 constantly, periodically, or non-periodically.

The imaging unit 24 includes any imaging module capable of imaging the surroundings of the vehicle 20. For example, the imaging unit 24 includes one or more cameras.

Each camera in the imaging unit 24 is arranged at an appropriate position on the vehicle 20 to image the surroundings of the vehicle 20. For example, the imaging unit 24 includes at least one of a front camera capable of imaging a subject ahead of the vehicle 20 and a rear camera capable of imaging a subject behind the vehicle 20. The imaging unit 24 may include, without being limited to the above, an omnidirectional camera capable of imaging the entire periphery of the vehicle 20.

The drive unit 25 includes any drive mechanism that enables loading of a package onto the vehicle 20, passing of the package loaded on the vehicle 20 to a user, and unloading of the package loaded on the vehicle 20 to an unattended delivery location. For example, the drive unit 25 includes at least one of an arm mechanism to be driven by a motor and a slide mechanism capable of linearly sliding a package and movable into and out of the body of the vehicle 20.

The control unit 26 includes one or more processors. In one embodiment, the "processor" is a general-purpose processor or a dedicated processor specialized for specific processing. However, the processor is not limited thereto. The control unit 26 is communicably connected to each of the components of the vehicle 20, and controls the overall operation of the vehicle 20.

The configuration of the terminal device 30 in the information processing system 1 will mainly be described. As shown in FIG. 2, the terminal device 30 includes a communication unit 31, a storage unit 32, an input unit 33, an output unit 34, an imaging unit 35, and a control unit 36.

The communication unit 31 includes a communication module connected to the network 40. For example, the communication unit 31 includes a communication module conforming to mobile communication standards such as 4G and 5G or the Internet standards. In one embodiment, the terminal device 30 is connected to the network 40 via the communication unit 31. The communication unit 31 transmits and receives various types of information via the network 40.

Examples of the storage unit 32 include, but are not limited to, a semiconductor memory, a magnetic memory, and an optical memory. The storage unit 32 functions as a main storage device, an auxiliary storage device, or a cache memory. The storage unit 32 stores any information to be used for operation of the terminal device 30. The storage unit 32 stores, for example, various types of information received or transmitted by a system program, an application program, and the communication unit 31. The information stored in the storage unit 32 can be updated by using information received from the network 40 via the communication unit 31.

The input unit 33 includes one or more input interfaces that detect user input and acquire input information based on the user's operation. For example, the input unit 33 includes a physical key, a capacitive key, a touch screen integrated with a display of the output unit 34, and a microphone that receives voice input.

The output unit 34 includes one or more output interfaces that output information to notify the user. For example, the output unit 34 includes a display that outputs visual information, and a loudspeaker that outputs audio information.

The imaging unit 35 includes any imaging module capable of imaging the surroundings of the terminal device 30. For example, the imaging unit 35 includes one or more cameras. Each camera in the imaging unit 35 is arranged at an appropriate position on the terminal device 30 to image the surroundings of the terminal device 30. For example, the imaging unit 35 includes at least one of an out-camera capable of imaging a subject opposite to the user holding the terminal device 30 and an in-camera capable of imaging a subject on the side of the user holding the terminal device 30. The imaging unit 35 may include, without being limited to the above, an omnidirectional camera capable of imaging the entire periphery of the terminal device 30.

The control unit 36 includes one or more processors. In one embodiment, the "processor" is a general-purpose processor or a dedicated processor specialized for specific processing. However, the processor is not limited thereto. The control unit 36 is communicably connected to each of the components of the terminal device 30, and controls the overall operation of the terminal device 30.

First Embodiment

Figure 3:
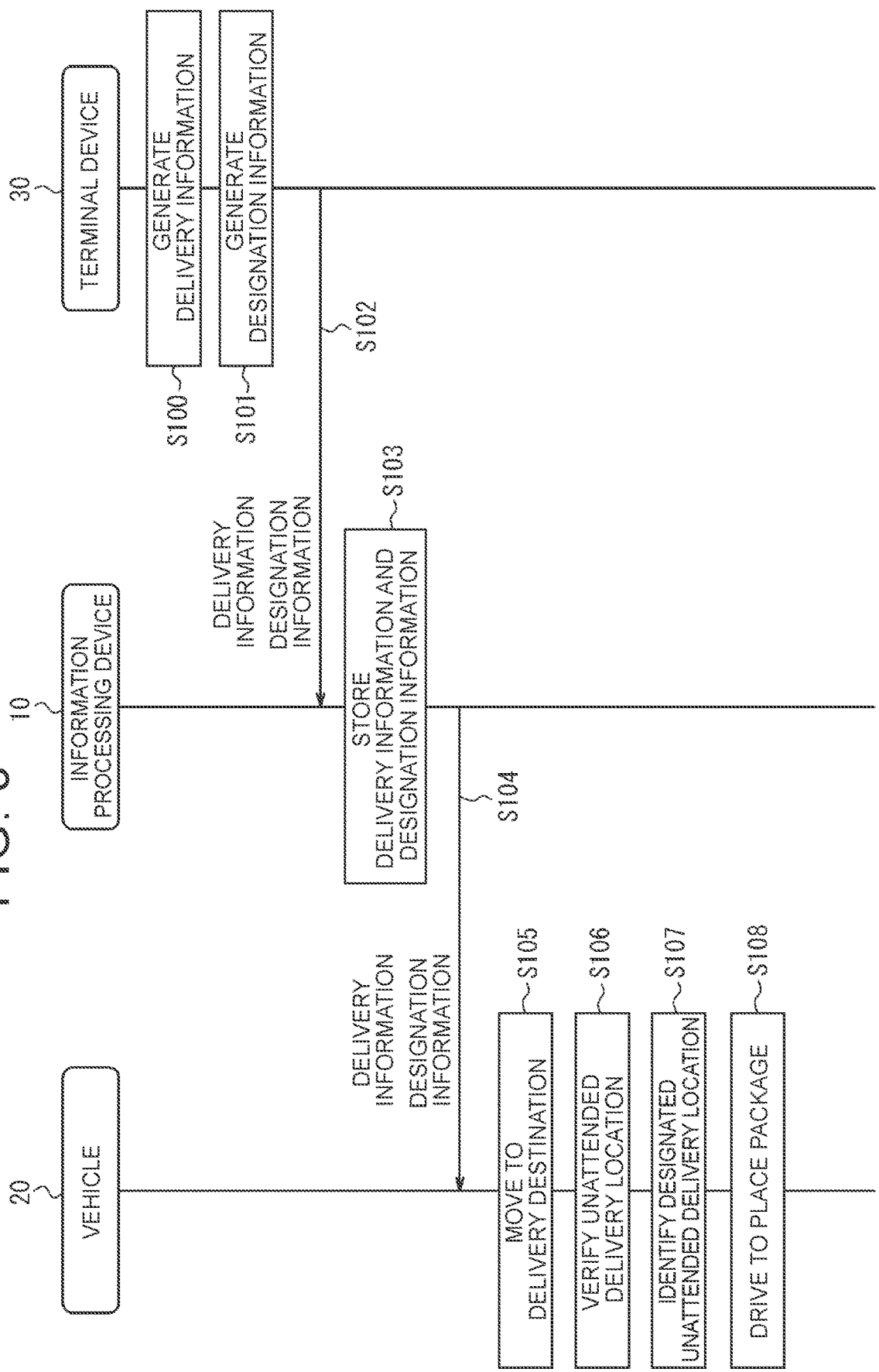
FIG. 3 is a sequence diagram illustrating a first embodiment of an information processing method to be executed by the information processing system in FIG. 1.

FIG. 3 is a sequence diagram illustrating a first embodiment of an information processing method to be executed by the information processing system 1 in FIG. 1. The first embodiment of the information processing method to be executed by the information processing system 1 in FIG. 1 will mainly be described with reference to FIG. 3. The sequence diagram of FIG. 3 shows a basic processing flow of the information processing method to be executed by the information processing system 1.

In Step S100, the control unit 36 of the terminal device 30 generates delivery information related to delivery of a package to the user by the vehicle 20. The "delivery information" herein includes, for example, a delivery destination address, a name of a user who is a recipient of a package, a telephone number and an e-mail address of the user, and a name of an item in the package to be delivered. The control unit 36 generates the delivery information by causing the output unit 34 to display a screen for prompting the user to input the delivery information and receiving an input operation of the user who inputs the delivery information by using the input unit 33 while viewing the screen.

In Step S101, the control unit 36 of the terminal device 30 generates designation information along with designation by the user about an unattended delivery location for delivery of the package. The control unit 36 generates the designation information by causing the output unit 34 to display a screen necessary to generate the designation information and receiving an input operation of the user who determines the designation information by using the input unit 33 while viewing the screen.

In Step S102, the control unit 36 of the terminal device 30 transmits the delivery information generated in Step S100 and the designation information generated in Step S101 to the information processing device 10 via the communication unit 31 and the network 40. As a result, the control unit 13 of the information processing device 10 acquires the delivery information and the designation information from the terminal device 30.

In Step S103, the control unit 13 of the information processing device 10 causes the storage unit 12 to store the delivery information and the designation information acquired in Step S102.

In Step S104, the control unit 13 of the information processing device 10 transmits the delivery information and the designation information acquired in Step S102 to the vehicle 20 via the communication unit 11 and the network 40. As a result, the control unit 26 of the vehicle 20 acquires the delivery information and the designation information from the information processing device 10.

In Step S105, the control unit 26 of the vehicle 20 causes the vehicle 20 to move to a delivery destination based on the delivery destination address in the delivery information acquired in Step S104.

In Step S106, the control unit 26 of the vehicle 20 verifies, based on the designation information acquired in Step S104, the unattended delivery location at the delivery destination to which the vehicle 20 has moved in Step S105.

In Step S107, the control unit 26 of the vehicle 20 identifies the unattended delivery location designated by the user by verifying the unattended delivery location in Step S106.

When the control unit 26 of the vehicle 20 has identified the unattended delivery location in Step S107, the control unit 26 drives the drive unit 25 of the vehicle 20 in Step S108 to place, on the unattended delivery location, the package addressed to the user at the delivery destination.

Figure 4:
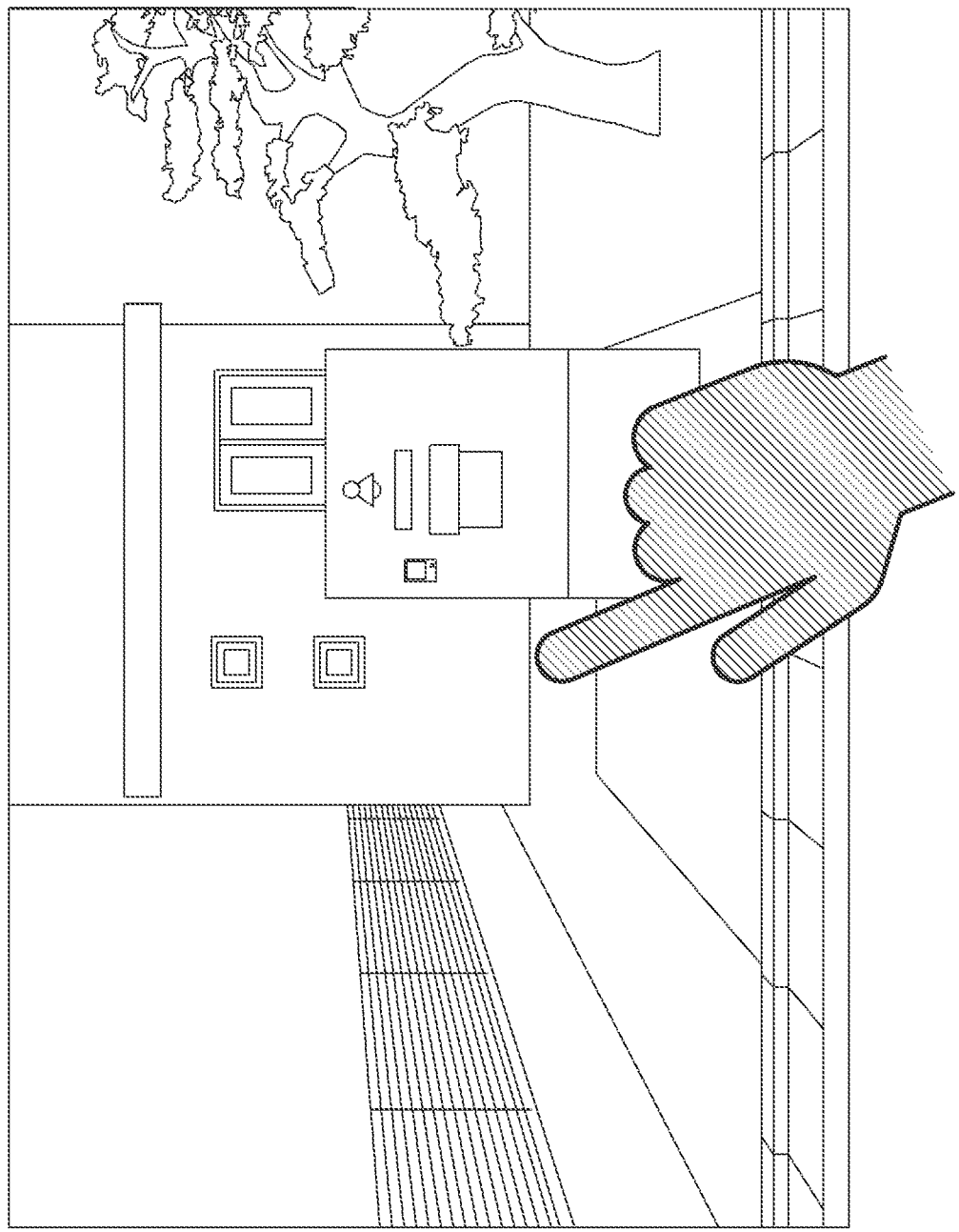
FIG. 4 is a first schematic diagram illustrating details of a process of Step S106 in FIG. 3.

FIG. 4 is a first schematic diagram illustrating details of the process of Step S106 in FIG. 3. A first example of details of the process of Step S106 in FIG. 3 will mainly be described with reference to FIG. 4. FIG. 4 schematically shows an image displayed on the output unit 34 of the terminal device 30 of the user and captured when the entrance of a house including the unattended delivery location to be designated by the user is imaged as a subject.

In the first example of details of the process of Step S106 in FIG. 3, the designation information includes information on a specific position designated by an input operation of the user in the image displayed on the output unit 34 of the terminal device 30 of the user. The "information on a specific position" herein includes, for example, information that allows the vehicle 20 to identify the specific position in the image that is designated by the input operation of the user, in addition to the information on the image displayed on the output unit 34 of the terminal device 30. The "information that allows the vehicle 20 to identify the specific position" includes, for example, a mark such as a pointer put on the specific position in the image that is designated by the input operation of the user.

The image displayed on the output unit 34 of the terminal device 30 of the user includes, for example, an image on an application installed in the terminal device 30 of the user, and an image captured by the imaging unit 35 of the terminal device 30 of the user. Examples of the application installed in the terminal device 30 of the user include a map application.

The control unit 36 of the terminal device 30 causes the output unit 34 to display the image as shown in FIG. 4 for the user when the user designates the unattended delivery location for delivery of the package. The control unit 36 causes the input unit 33 to receive the input operation of the user who designates the specific position in the image displayed on the output unit 34. For example, the control unit 36 causes the input unit 33 to receive an input operation of the user who taps the specific position at the entrance of the house in the image displayed on the output unit 34 as shown in FIG. 4. The control unit 36 generates, as the designation information, information on the specific position in the image that is designated by the input operation of the user.

The control unit 26 of the vehicle 20 acquires in advance the designation information generated by the terminal device 30 as in the flow described above. When the vehicle 20 has moved and arrived at the delivery destination, the control unit 26 uses the imaging unit 24 of the vehicle 20 to image the surroundings of the vehicle 20. The control unit 26 verifies the unattended delivery location by comparing the image captured by using the imaging unit 24 and the information on the specific position in the image that is designated by the user by using the terminal device 30.

More specifically, the control unit 26 compares the image captured by using the imaging unit 24 and the image that has been displayed on the output unit 34 of the terminal device 30 with the mark such as a pointer put on the specific position designated by the input operation of the user. The control unit 26 identifies, in the image captured by using the imaging unit 24, a position corresponding to the specific position in the image that is designated by the user by using the terminal device 30. As a result, the control unit 26 identifies the unattended delivery location designated by the user not only in the image but also in the real space.

Figure 5:
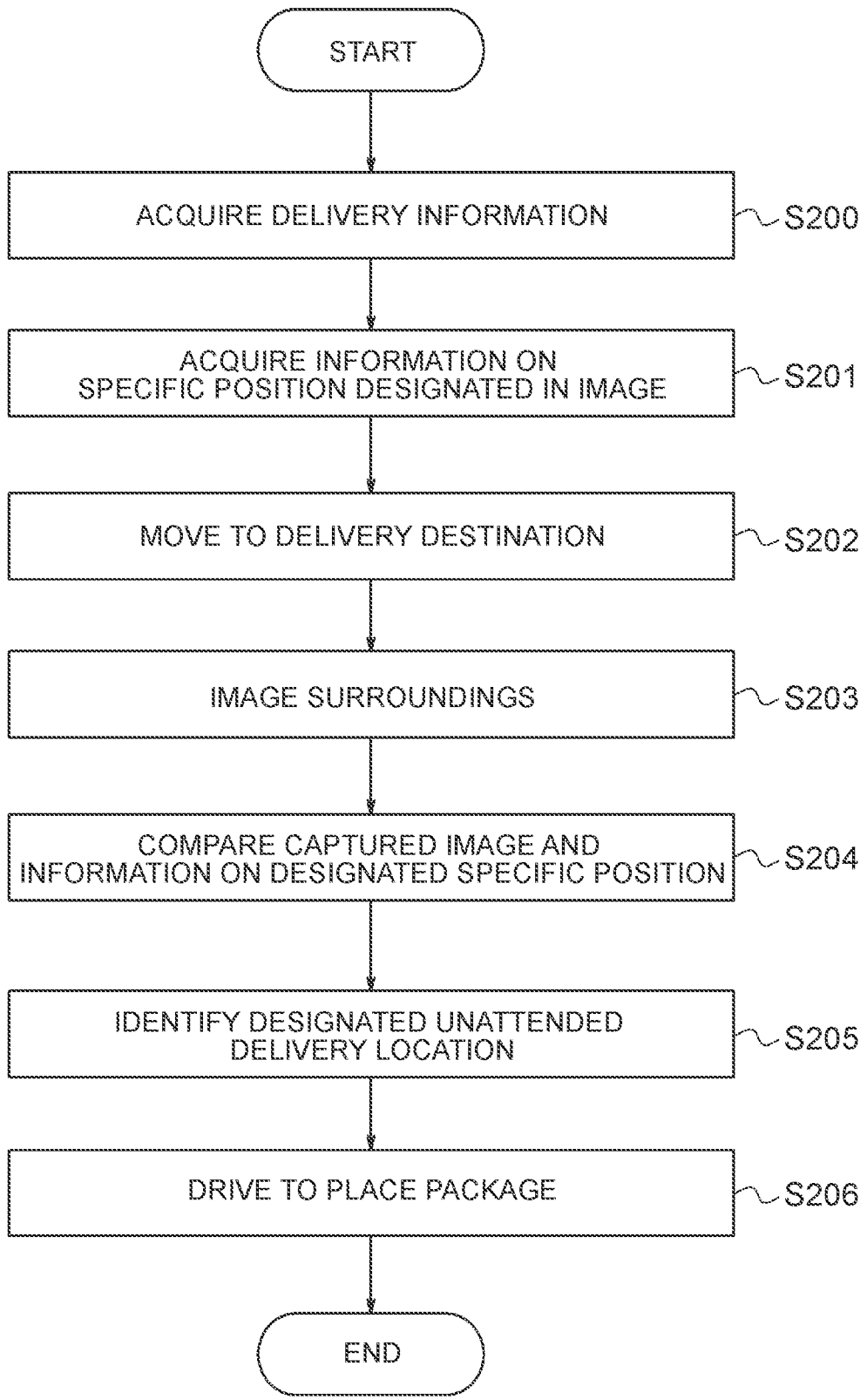
FIG. 5 is a flowchart illustrating a first example of an information processing method to be executed by the vehicle in FIG. 1.

FIG. 5 is a flowchart illustrating a first example of an information processing method to be executed by the vehicle 20 in FIG. 1. The first example of the information processing method to be executed by the vehicle 20 in FIG. 1 will be described with reference to FIG. 5. The flowchart of FIG. 5 is based on the first example of details of the process of Step S106 in FIG. 3 that has been described above with reference to FIG. 4.

In Step S200, the control unit 26 of the vehicle 20 acquires the delivery information from the information processing device 10. The control unit 26 receives the delivery information from the information processing device 10 via the network 40 and the communication unit 21.

In Step S201, the control unit 26 acquires, as the designation information from the information processing device 10, the information on the specific position designated by the input operation of the user in the image displayed on the output unit 34 of the terminal device 30 of the user. The control unit 26 receives such information on the specific position from the information processing device 10 via the network 40 and the communication unit 21.

In Step S202, the control unit 26 causes the vehicle 20 to move to the delivery destination based on the delivery destination address in the delivery information acquired in Step S200.

When the vehicle 20 has moved and arrived at the delivery destination in Step S202, the control unit 26 uses the imaging unit 24 to image the surroundings of the vehicle 20 in Step S203.

In Step S204, the control unit 26 compares the image captured by the imaging unit 24 in Step S203 and the information on the specific position in the image that is designated by the user by using the terminal device 30. As a result, the control unit 26 verifies, based on the designation information acquired in Step S201, the unattended delivery location at the delivery destination to which the vehicle 20 has moved in Step S202.

In Step S205, the control unit 26 identifies the unattended delivery location designated by the user by verifying the unattended delivery location in Step S204.

When the control unit 26 has identified the unattended delivery location in Step S205, the control unit 26 drives the drive unit 25 in Step S206 to place, on the unattended delivery location, the package addressed to the user at the delivery destination.

Figure 6:
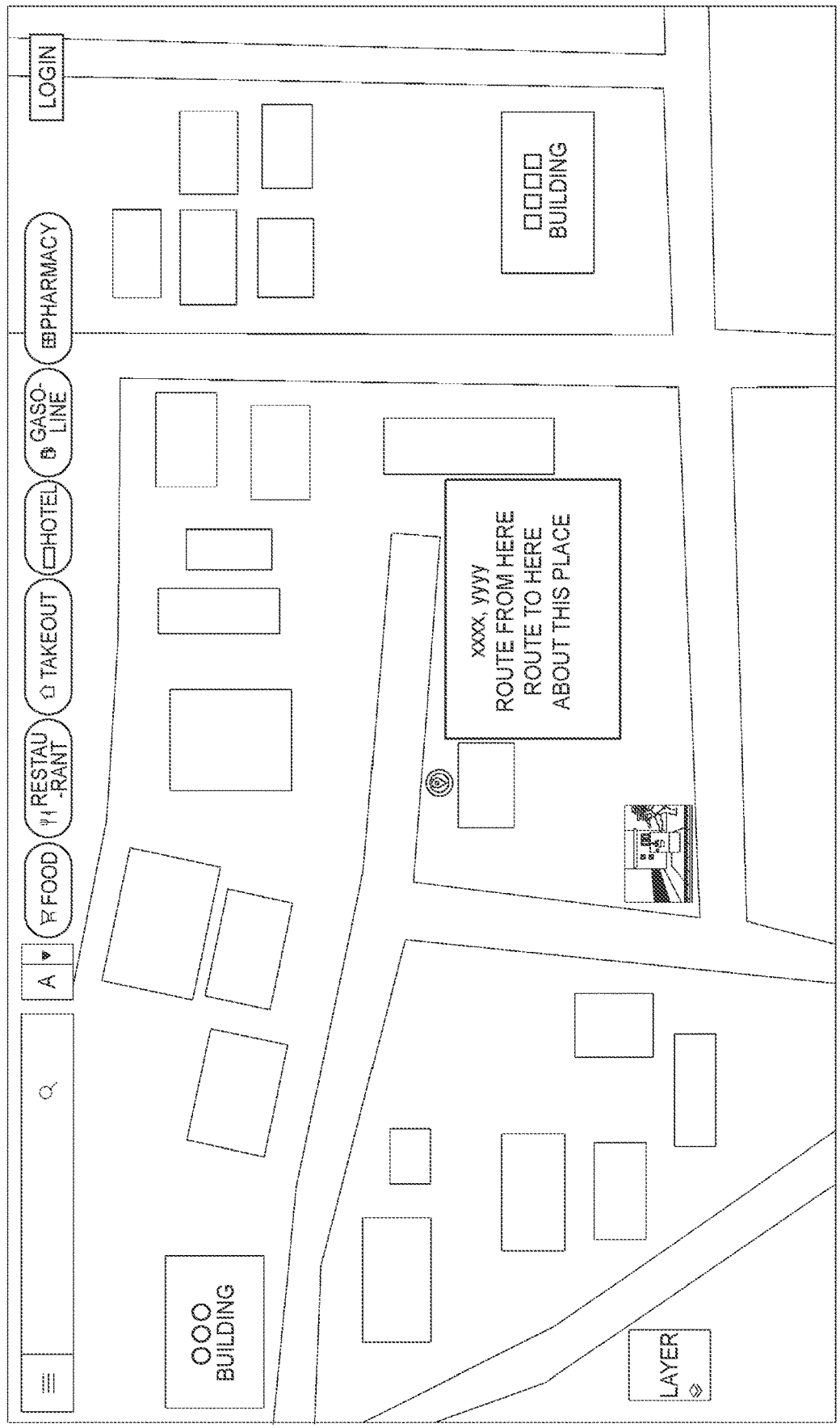
FIG. 6 is a second schematic diagram illustrating details of the process of Step S106 in FIG. 3.

FIG. 6 is a second schematic diagram illustrating details of the process of Step S106 in FIG. 3. A second example of details of the process of Step S106 in FIG. 3 will mainly be described with reference to FIG. 6. FIG. 6 schematically shows a map application screen displayed on the output unit 34 of the terminal device 30 of the user and including a predetermined area centered on the unattended delivery location to be designated by the user.

In the second example of details of the process of Step S106 in FIG. 3, the designation information includes coordinate information designated by an input operation of the user on an application installed in the terminal device 30 of the user. The "coordinate information" herein includes information such as latitude and longitude acquired on the application installed in the terminal device 30. Examples of the application installed in the terminal device 30 of the user include a map application.

The control unit 36 of the terminal device 30 causes the output unit 34 to display the map application screen as shown in FIG. 6 for the user when the user designates the unattended delivery location for delivery of the package. The control unit 36 causes the input unit 33 to receive the input operation of the user who designates specific coordinates (xxxx, yyyy) in the map application screen displayed on the output unit 34. For example, the control unit 36 causes the input unit 33 to receive an input operation of the user who taps a specific position at the entrance of the house in the map application screen displayed on the output unit 34 as shown in FIG. 6. The control unit 36 generates coordinate information designated by the input operation of the user as the designation information.

The control unit 26 of the vehicle 20 acquires in advance the designation information generated by the terminal device 30 as in the flow described above. When the vehicle 20 has moved and arrived at the delivery destination, the control unit 26 uses the acquisition unit 23 of the vehicle 20 to acquire position information of the vehicle 20. The control unit 26 verifies the unattended delivery location by comparing the position information of the vehicle 20 that is acquired by using the acquisition unit 23 and the coordinate information designated by the user by using the terminal device 30.

More specifically, the control unit 26 identifies a location where the position information of the vehicle 20 that is acquired by using the acquisition unit 23 agrees with the coordinate information designated by the user by using the terminal device 30. As a result, the control unit 26 identifies the unattended delivery location designated by the user.

Figure 7:
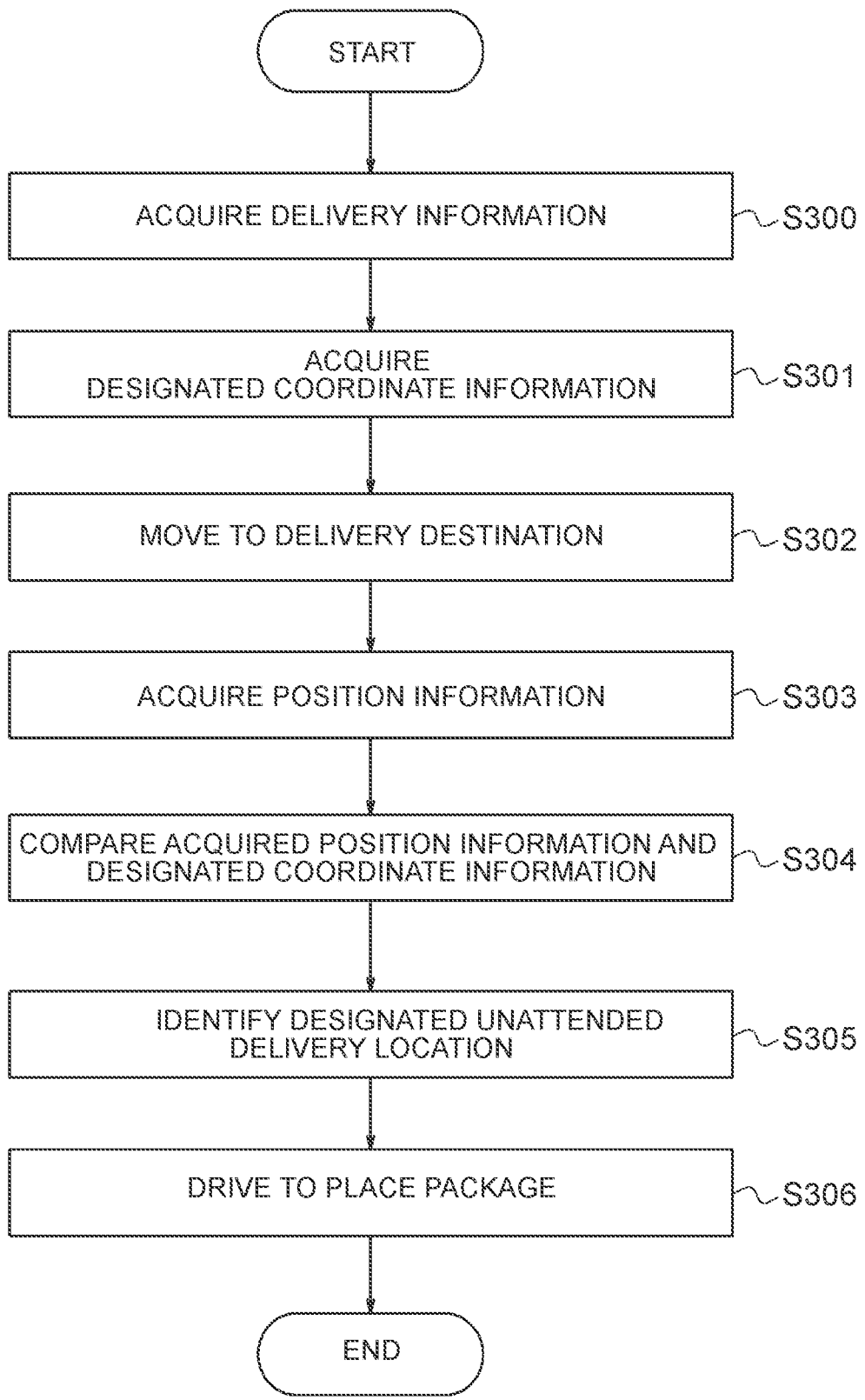
FIG. 7 is a flowchart illustrating a second example of the information processing method to be executed by the vehicle in FIG. 1.

FIG. 7 is a flowchart illustrating a second example of the information processing method to be executed by the vehicle 20 in FIG. 1. The second example of the information processing method to be executed by the vehicle 20 in FIG. 1 will be described with reference to FIG. 7. The flowchart of FIG. 7 is based on the second example of details of the process of Step S106 in FIG. 3 that has been described above with reference to FIG. 6.

In Step S300, the control unit 26 of the vehicle 20 acquires the delivery information from the information processing device 10. The control unit 26 receives the delivery information from the information processing device 10 via the network 40 and the communication unit 21.

In Step S301, the control unit 26 acquires, as the designation information from the information processing device 10, the coordinate information designated by the input operation of the user in the map application screen displayed on the output unit 34 of the terminal device 30 of the user. The control unit 26 receives these coordinate information from the information processing device 10 via the network 40 and the communication unit 21.

In Step S302, the control unit 26 causes the vehicle 20 to move to the delivery destination based on the delivery destination address in the delivery information acquired in Step S300.

When the vehicle 20 has moved and arrived at the delivery destination in Step S302, the control unit 26 uses the acquisition unit 23 to acquire the position information of the vehicle 20 in Step S303.

In Step S304, the control unit 26 compares the position information of the vehicle 20 that is acquired by the acquisition unit 23 in Step S303 and the coordinate information designated by the user by using the terminal device 30. As a result, the control unit 26 verifies, based on the designation information acquired in Step S301, the unattended delivery location at the delivery destination to which the vehicle 20 has moved in Step S302.

In Step S305, the control unit 26 identifies the unattended delivery location designated by the user by verifying the unattended delivery location in Step S304.

When the control unit 26 has identified the unattended delivery location in Step S305, the control unit 26 drives the drive unit 25 in Step S306 to place, on the unattended delivery location, the package addressed to the user at the delivery destination.

Second Embodiment

Figure 8:
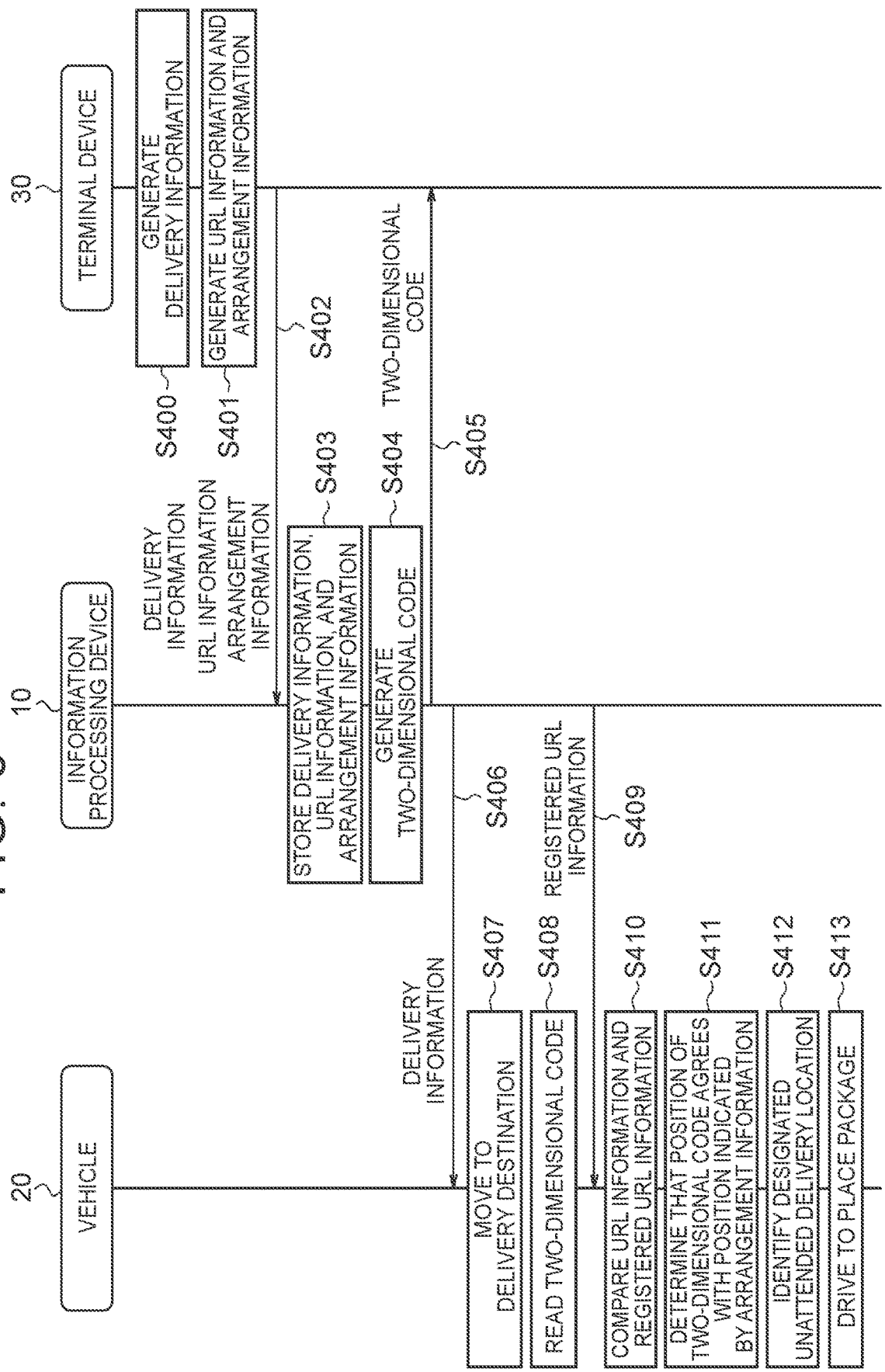
FIG. 8 is a sequence diagram illustrating a second embodiment of the information processing method to be executed by the information processing system in FIG. 1.

FIG. 8 is a sequence diagram illustrating a second embodiment of the information processing method to be executed by the information processing system 1 in FIG. 1. The second embodiment of the information processing method to be executed by the information processing system 1 in FIG. 1 will mainly be described with reference to FIG. 8. The sequence diagram of FIG. 8 shows a basic processing flow of the information processing method to be executed by the information processing system 1.

In the second embodiment, the contents of the designation information are different from those in the first embodiment. In the second embodiment, the designation information includes uniform resource locator (URL) information readable from a two-dimensional code arranged at the unattended delivery location by the user, and arrangement information indicating a specific arrangement location of the two-dimensional code and readable from the two-dimensional code. The "two-dimensional code" herein includes, for example, a quick response (QR) code (registered trademark) or a barcode. The "arrangement information" includes, for example, text information, image information, or audio information indicating the specific arrangement location of the two-dimensional code.

In Step S400, the control unit 36 of the terminal device 30 generates delivery information related to delivery of a package to the user by the vehicle 20. The control unit 36 generates the delivery information by causing the output unit 34 to display a screen for prompting the user to input the delivery information and receiving an input operation of the user who inputs the delivery information by using the input unit 33 while viewing the screen.

In Step S401, the control unit 36 of the terminal device 30 generates designation information along with designation by the user about an unattended delivery location for delivery of the package. The control unit 36 generates the designation information by causing the output unit 34 to display a screen necessary to generate the designation information and receiving an input operation of the user who determines the designation information by using the input unit 33 while viewing the screen.

For example, the control unit 36 causes the output unit 34 to display a screen necessary to generate URL information associated with a two-dimensional code to be arranged at the unattended delivery location by the user. The control unit 36 generates the URL information as the designation information by receiving an input operation of the user who determines the URL information by using the input unit 33 while viewing the screen.

For example, the control unit 36 causes the output unit 34 to display a screen necessary to generate arrangement information associated with the two-dimensional code to be arranged at the unattended delivery location by the user. The control unit 36 generates the arrangement information as the designation information by receiving an input operation of the user who determines the arrangement information by using the input unit 33 while viewing the screen.

In Step S402, the control unit 36 of the terminal device 30 transmits the delivery information generated in Step S400 and the designation information including the URL information and the arrangement information generated in Step S401 to the information processing device 10 via the communication unit 31 and the network 40. As a result, the control unit 13 of the information processing device 10 acquires the delivery information and the designation information including the URL information and the arrangement information from the terminal device 30.

In Step S403, the control unit 13 of the information processing device 10 causes the storage unit 12 to store the delivery information and the designation information including the URL information and the arrangement information that are acquired in Step S402. As a result, the control unit 13 causes the storage unit 12 to store the URL information in the designation information acquired in Step S402 as registered URL information that is preregistered by the user when designating the unattended delivery location.

In Step S404, the control unit 13 of the information processing device 10 generates a two-dimensional code associated with the designation information including the URL information and the arrangement information acquired in Step S402.

In Step S405, the control unit 13 of the information processing device 10 transmits the two-dimensional code generated in Step S404 to the terminal device 30 via the communication unit 11 and the network 40. As a result, the control unit 36 of the terminal device 30 acquires the two-dimensional code from the information processing device 10.

For example, the user then prints, on a paper medium, the two-dimensional code displayed on the output unit 34 based on output control by the control unit 36 of the terminal device 30, and arranges the two-dimensional code to adjoin the unattended delivery location designated by the user.

In Step S406, the control unit 13 of the information processing device 10 transmits the delivery information acquired in Step S402 to the vehicle 20 via the communication unit 11 and the network 40. As a result, the control unit 26 of the vehicle 20 acquires the delivery information from the information processing device 10.

In Step S407, the control unit 26 of the vehicle 20 causes the vehicle 20 to move to a delivery destination based on the delivery destination address in the delivery information acquired in Step S406.

In Step S408, the control unit 26 of the vehicle 20 causes the imaging unit 24 to read the two-dimensional code arranged by the user after Step S405. As a result, the control unit 26 acquires, from the two-dimensional code, the designation information including the URL information and the arrangement information generated in Step S401.

In Step S409, the control unit 26 of the vehicle 20 reads the registered URL information stored in the storage unit 12 of the information processing device 10 in Step S403, and receives the registered URL information from the information processing device 10 via the network 40 and the communication unit 21. For example, when a plurality of pieces of registered URL information is stored in the storage unit 12 of the information processing device 10, the control unit 26 reads registered URL information associated with the delivery information generated in Step S400 and associated with the URL information generated in Step S401.

In Step S410, the control unit 26 of the vehicle 20 compares the URL information acquired in Step S408 and the registered URL information acquired in Step S409. It is assumed that the two-dimensional code read by the control unit 26 by using the imaging unit 24 in Step S408 is arranged by the user after Step S405 about the delivery associated with the delivery information generated in Step S400. In this case, the control unit 26 determines that the URL information acquired in Step S408 agrees with the registered URL information read in Step S409 and associated with the two-dimensional code.

In Step S411, the control unit 26 of the vehicle 20 determines that the position of the two-dimensional code read in Step S408 agrees with the position indicated by the arrangement information acquired in Step S408. That is, the control unit 26 determines that the two-dimensional code read in Step S408 is correctly arranged at the specific arrangement location of the two-dimensional code that is designated in advance by the user as the arrangement information.

The control unit 26 verifies the unattended delivery location based on the comparison process in Step S410 and the determination process in Step S411 as described above.

In Step S412, the control unit 26 of the vehicle 20 identifies the unattended delivery location designated by the user by verifying the unattended delivery location in Steps S410 and S411.

When the control unit 26 of the vehicle 20 has identified the unattended delivery location in Step S412, the control unit 26 drives the drive unit 25 of the vehicle 20 in Step S413 to place, on the unattended delivery location, the package addressed to the user at the delivery destination.

Figure 9:
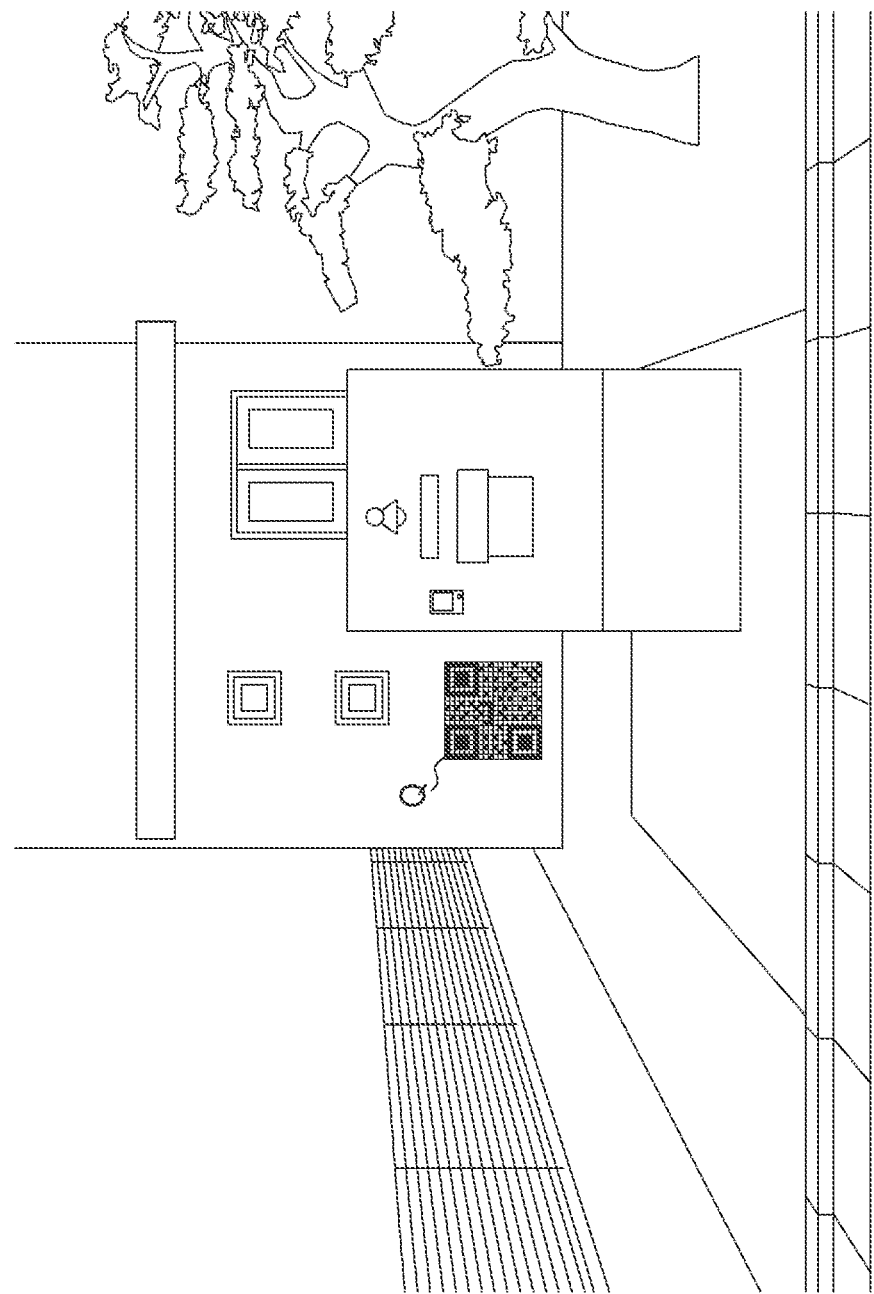
FIG. 9 is a schematic diagram illustrating details of a series of processes in FIG. 8.

FIG. 9 is a schematic diagram illustrating details of the series of processes in FIG. 8. Details of the series of processes in FIG. 8 will mainly be described with reference to FIG. 9. FIG. 9 schematically shows the two-dimensional code arranged at a location Q adjacent to the unattended delivery location to be designated by the user at the entrance of the house.

The control unit 36 of the terminal device 30 causes the output unit 34 to display, for the user, the two-dimensional code acquired by the serial flow from Step S401 to Step S405 in FIG. 8. The user prints the two-dimensional code displayed on the output unit 34 of the terminal device 30 on a paper medium or the like, and arranges the two-dimensional code at the location Q adjacent to the unattended delivery location designated by the user. For example, the user affixes the paper medium or the like with the printed two-dimensional code to an outer wall of the house. In this case, the user pre-inputs, to the terminal device 30 as the arrangement information in Step S401 of FIG. 8, information indicating that the two-dimensional code will be arranged at the specific location Q on the outer wall of the house.

When the vehicle 20 arrives at the delivery destination in Step S407 of FIG. 8, the control unit 26 of the vehicle 20 searches the surroundings by using the imaging unit 24, and identifies the two-dimensional code arranged at the location Q. The control unit 26 reads the two-dimensional code arranged at the location Q by using the imaging unit 24 in Step S408 of FIG. 8.

The control unit 26 determines whether the URL information acquired from the two-dimensional code arranged at the location Q agrees with the registered URL information read from the information processing device 10. For example, it is assumed that the two-dimensional code arranged at the location Q is identical to that received by the terminal device 30 from the information processing device 10 in Step S405 about the delivery associated with the delivery information generated in Step S400 of FIG. 8. In such a case, the control unit 26 determines that the URL information acquired from the two-dimensional code arranged at the location Q agrees with the registered URL information read from the information processing device 10.

On the other hand, it is assumed that the two-dimensional code arranged at the location Q is not identical to that received by the terminal device 30 from the information processing device 10 in Step S405 of FIG. 8 for some reason. In such a case, the control unit 26 determines that the URL information acquired from the two-dimensional code arranged at the location Q does not agree with the registered URL information read from the information processing device 10.

The control unit 26 determines whether the position of the two-dimensional code read by the imaging unit 24 agrees with the position indicated by the arrangement information generated in advance in Step S401 of FIG. 8. For example, when the two-dimensional code read by the imaging unit 24 is arranged at the location Q, the control unit 26 determines that the position of the two-dimensional code agrees with the position indicated by the arrangement information. For example, when the two-dimensional code read by the imaging unit 24 is not arranged at the location Q, the control unit 26 determines that the position of the two-dimensional code does not agree with the position indicated by the arrangement information.

When the control unit 26 determines that the URL information does not agree with the registered URL information, the control unit 26 drives the vehicle 20 to bring the package back without placing the package. Similarly, when the control unit 26 determines that the position of the two-dimensional code does not agree with the position indicated by the arrangement information, the control unit 26 drives the vehicle 20 to bring the package back without placing the package. When the control unit 26 determines that the URL information agrees with the registered URL information and the position of the two-dimensional code agrees with the position indicated by the arrangement information, the control unit 26 drives the drive unit 25 to place the package on the designated unattended delivery location.

FIG. 10 is a flowchart illustrating a third example of the information processing method to be executed by the vehicle 20 in FIG. 1. The third example of the information processing method to be executed by the vehicle 20 in FIG. 1 will be described with reference to FIG. 10. The flowchart of FIG. 10 is based on details of the series of processes in FIG. 8 that have been described above with reference to FIG. 9.

In Step S500, the control unit 26 of the vehicle 20 acquires the delivery information from the information processing device 10. The control unit 26 receives the delivery information from the information processing device 10 via the network 40 and the communication unit 21.

In Step S501, the control unit 26 causes the vehicle 20 to move to the delivery destination based on the delivery destination address in the delivery information acquired in Step S500.

When the vehicle 20 has moved and arrived at the delivery destination in Step S501, the control unit 26 searches the surroundings by using the imaging unit 24, and identifies and reads the two-dimensional code in Step S502.

In Step S503, the control unit 26 reads the registered URL information stored in the storage unit 12 of the information processing device 10, and receives the registered URL information from the information processing device 10 via the network 40 and the communication unit 21.

In Step S504, the control unit 26 determines whether the URL information acquired in Step S502 agrees with the registered URL information acquired in Step S503. When the control unit 26 determines that the URL information agrees with the registered URL information, the control unit 26 executes a process of Step S505. When the control unit 26 determines that the URL information does not agree with the registered URL information, the control unit 26 executes a process of Step S506.

In Step S505, the control unit 26 determines whether the position of the two-dimensional code identified and read in Step S502 agrees with the position indicated by the arrangement information acquired in Step S502. When the control unit 26 determines that the position of the two-dimensional code agrees with the position indicated by the arrangement information, the control unit 26 executes a process of Step S507. When the control unit 26 determines that the position of the two-dimensional code does not agree with the position indicated by the arrangement information, the control unit 26 executes the process of Step S506.

When the control unit 26 determines in Step S504 that the URL information does not agree with the registered URL information or determines in Step S505 that the position of the two-dimensional code does not agree with the position indicated by the arrangement information, the control unit 26 drives the vehicle 20 to bring the package back in Step S506 without leaving the package.

In Step S507, the control unit 26 identifies the unattended delivery location designated by the user by verifying the unattended delivery location in Steps S504 and S505.

When the control unit 26 has identified the unattended delivery location in Step S507, the control unit 26 drives the drive unit 25 in Step S508 to place, on the unattended delivery location, the package addressed to the user at the delivery destination.

Effects

According to one embodiment as described above, it is possible to leave the package accurately at the location desired by the user. For example, the vehicle 20 can accurately leave the package at the unattended delivery location predesignated by the user for the delivery of the package by identifying the unattended delivery location designated by the user based on the designation information. For example, if the package is placed at a location other than the unattended delivery location designated by the user, the package may be damaged due to contact with a passerby, a passing vehicle, or the like. In addition, the package may be stolen. According to one embodiment, these possibilities are reduced and the package is delivered more safely by the method desired by the user. Therefore, the reliability of the package delivery service for the user and the convenience of the user are improved.

The designation information includes the information on the specific position designated by the input operation of the user in the image on the application installed in the terminal device 30. Therefore, the user can easily designate the unattended delivery location while operating the application of the terminal device 30 of the user. The vehicle 20 can identify the unattended delivery location designated by the user in the image in more detail. Therefore, the vehicle 20 can accurately identify the unattended delivery location not only in the image but also in the real space. Thus, the processing accuracy of the vehicle 20 when leaving the package at the location desired by the user is improved. That is, the vehicle 20 can leave the package more accurately at the location desired by the user. As a result, the reliability of the package delivery service for the user and the convenience of the user are further improved.

The designation information includes the information on the specific position designated by the input operation of the user in the image captured by the terminal device 30. Therefore, the user can easily designate the unattended delivery location while operating the image captured by using the terminal device 30 of the user. The vehicle 20 can identify the unattended delivery location designated by the user in the image in more detail. Therefore, the vehicle 20 can accurately identify the unattended delivery location not only in the image but also in the real space. Thus, the processing accuracy of the vehicle 20 when leaving the package at the location desired by the user is improved. That is, the vehicle 20 can leave the package more accurately at the location desired by the user. As a result, the reliability of the package delivery service for the user and the convenience of the user are further improved.

The vehicle 20 verifies the unattended delivery location by comparing the image captured by using the imaging unit 24 and the information on the specific position designated in the image by using the terminal device 30. Therefore, the vehicle 20 can accurately compare the image captured by using the imaging unit 24 and the image with the mark such as a pointer put on the specific position by using an image recognition technology or the like. The vehicle 20 can accurately identify the unattended delivery location designated by the user by using the terminal device 30 not only in the image but also in the real space while comparing the two images. Thus, the processing accuracy of the vehicle 20 when leaving the package at the location desired by the user is improved. That is, the vehicle 20 can leave the package more accurately at the location desired by the user. As a result, the reliability of the package delivery service for the user and the convenience of the user are further improved.

The vehicle 20 verifies the unattended delivery location by comparing the URL information readable from the two-dimensional code and the registered URL information. Therefore, the vehicle 20 can more accurately identify the unattended delivery location designated by the user by using the two-dimensional code arranged in the real space as a mark. For example, if a third person different from the user has arranged, at any location, a two-dimensional code different from the two-dimensional code registered by the user, the vehicle 20 can bring the package back without leaving the package because the URL information does not agree with the registered URL information. Therefore, the possibility of damage to or theft of the package due to placement of the package at a location other than the unattended delivery location designated by the user is reduced, and the package is delivered more safely by the method desired by the user. As a result, the reliability of the package delivery service for the user and the convenience of the user are further improved.

When the vehicle 20 determines that the position of the two-dimensional code does not agree with the position indicated by the arrangement information, the vehicle 20 brings the package back without leaving the package. Even if, for example, the paper medium with the printed two-dimensional code is moved from the designated unattended delivery location due to wind or intentionally by a third person different from the user, the vehicle 20 can safely bring the package back without leaving the package at a wrong location. Therefore, the possibility of damage to or theft of the package due to placement of the package at a location other than the unattended delivery location designated by the user is reduced, and the package is delivered more safely by the method desired by the user. As a result, the reliability of the package delivery service for the user and the convenience of the user are further improved.

The designation information includes the coordinate information designated by the input operation of the user on the application installed in the terminal device 30. Therefore, the user can easily designate the unattended delivery location while operating the application screen of the terminal device 30 of the user. The vehicle 20 can identify the unattended delivery location designated by the user in more detail as the coordinate information. The vehicle 20 can accurately identify the designated unattended delivery location by the acquisition unit 23 including the GPS receiver. Thus, the processing accuracy of the vehicle 20 when leaving the package at the location desired by the user is improved. That is, the vehicle 20 can leave the package more accurately at the location desired by the user. As a result, the reliability of the package delivery service for the user and the convenience of the user are further improved.

The vehicle 20 verifies the unattended delivery location by comparing the position information acquired by using the acquisition unit 23 and the designated coordinate information. Therefore, the vehicle 20 can objectively and accurately compare the position information acquired by using the acquisition unit 23 and the designated coordinate information as numerical values. The vehicle 20 can accurately identify the unattended delivery location designated by the user by using the terminal device 30 while comparing the two pieces of information. Thus, the processing accuracy of the vehicle 20 when leaving the package at the location desired by the user is improved. That is, the vehicle 20 can leave the package more accurately at the location desired by the user. As a result, the reliability of the package delivery service for the user and the convenience of the user are further improved.

Modifications

Although the present disclosure has been described above based on the drawings and the embodiment, it should be noted that those skilled in the art can make various modifications and alterations thereto based on the present disclosure. It should therefore be understood that these modifications and alterations are within the scope of the present disclosure. For example, the functions included in the components, steps, or the like can be rearranged so as not to be logically inconsistent, and a plurality of components, steps, or the like can be combined into a unit or divided apart.

For example, at least a part of the processing operations to be executed by the vehicle 20 in the embodiment described above may be executed by the information processing device 10 or the terminal device 30. For example, the information processing device 10 instead of the vehicle 20 may execute the series of processing operations described above related to the vehicle 20. In this case, the information processing device 10 executes each step in the sequence diagrams and flowcharts described above while transmitting and receiving information necessary for the processes to and from the vehicle 20. At least a part of the processing operations to be executed by the information processing device 10 or the terminal device 30 may be executed by the vehicle 20.

For example, a general-purpose electronic device such as a smartphone or a computer may be configured to function as the vehicle 20 according to the embodiment described above. Specifically, a program describing details of processes that implement the functions of the vehicle 20 or the like according to the embodiment is stored in a memory of the electronic device, and is read and executed by a processor of the electronic device. Thus, the disclosure according to one embodiment can be implemented also as the program executable by the processor.

Alternatively, the disclosure according to one embodiment can be implemented also as a computer-readable medium that stores a program executable by one or more processors to cause the vehicle 20 or the like according to the embodiment to execute each function. It should be understood that the configurations described above are also included in the scope of the present disclosure.

For example, the information processing device 10 described in the above embodiment may be mounted on the vehicle 20. With this configuration, the information processing device 10 may directly perform information communication with the vehicle 20 without the network 40.

In the embodiment described above, the vehicle 20 indirectly acquires the necessary information from the terminal device 30 via the information processing device 10, but the acquisition is not limited to this case. The vehicle 20 may directly acquire the necessary information from the terminal device 30 without intermediation of the information processing device 10. That is, the information processing system 1 may include the vehicle 20 and the terminal device 30, and need not include the information processing device 10.

In the second embodiment described above, the code that mediates the designation information includes the two-dimensional code arranged at the unattended delivery location by the user, but the code is not limited to the two-dimensional code. The code may include, for example, a one-dimensional code.

In the second embodiment described above, the information associated with the two-dimensional code includes the URL information and the arrangement information, but is not limited to those pieces of information. The information associated with the two-dimensional code may include any one piece of the information alone. That is, the designation information may include any one piece of the information alone. On the other hand, the information associated with the two-dimensional code may include, in addition to the URL information and the arrangement information, user's personal information related to delivery that can be acquired only by the vehicle 20, such as the delivery information subjected to encryption.

The information processing system 1 according to one embodiment may execute only one of the information processing methods in the first embodiment and the second embodiment, or may execute both the information processing methods in parallel.

When the delivery of the package to the unattended delivery location designated by the user is completed, the vehicle 20 according to one embodiment may send a notification of the delivery completion to a user's contact address in the delivery information acquired from the terminal device 30 via the information processing device 10.

What is claimed is:

1. A vehicle configured to autonomously deliver a package, the vehicle comprising a processor configured to:
   acquire designation information generated along with designation by a user about an unattended delivery location for delivery of the package, the designation information includes uniform resource locator information readable from a two-dimensional code arrange at the unattended delivery location by the user, and arrangement information indicating a specific arrangement location of the two-dimensional code and readable from the two-dimensional code;
   verify the unattended delivery location by comparing the uniform resource locator information and registered uniform resource locator information that is preregistered when designating the unattended delivery location and is associated with the two-dimensional code;
   identify the unattended delivery location designated by the user by verifying the unattended delivery location;
   control the vehicle to autonomously deliver the package to the unattended delivery location designated by the user when the unattended delivery location is identified; and
   when the processor determines that a position of the two-dimensional code does not agree with a position indicated by the arrangement information, control the vehicle to autonomously bring the package back without leaving the package.

2. The vehicle according to claim 1, wherein the designation information includes information on a specific position designated by an input operation of the user in an image on an application installed in a terminal device of the user.

3. The vehicle according to claim 1, wherein the designation information includes information on a specific position designated by an input operation of the user in an image captured by a terminal device of the user.

4. The vehicle according to claim 2, further comprising a camera configured to image surroundings of the vehicle, wherein the processor is configured to verify the unattended delivery location by comparing an image captured by using the camera and the information on the designated specific position.

5. The vehicle according to claim 1, further comprising a GPS receiver configured to acquire position information of the vehicle, wherein:
   the designation information includes coordinate information designated by an input operation of the user on an application installed in a terminal device of the user; and
   the processor is configured to verify the unattended delivery location by comparing the position information acquired by using the GPS receiver and the designated coordinate information.

6. A non-transitory storage medium storing instructions that are executable by one or more processors and that cause the one or more processors to perform functions comprising:
   acquiring, by a vehicle configured to autonomously deliver a package, designation information generated along with designation by a user about an unattended delivery location for delivery of the package, the designation information includes uniform resource locator information readable from a two-dimensional code arrange at the unattended delivery location by the user, and arrangement information indicating a specific arrangement location of the two-dimensional code and readable from the two-dimensional code;

verifying the unattended delivery location by comparing the uniform resource locator information and registered uniform that is preregistered when designating the unattended delivery location and is associated with the two-dimensional code;

identifying the unattended delivery location designated by the user by verifying the unattended delivery location;

controlling the vehicle to autonomously deliver the package to the unattended delivery location when the unattended delivery location is identified; and when the processor determines that a position of the two-dimensional code does not agree with a position indicated by the arrangement information, controlling the vehicle to autonomously bring the package back without leaving the package.

7. The non-transitory storage medium according to claim 6, wherein the designation information includes information on a specific position designated by an input operation of the user in an image on an application installed in a terminal device of the user.

8. The non-transitory storage medium according to claim 6, wherein the designation information includes information on a specific position designated by an input operation of the user in an image captured by a terminal device of the user.

9. The non-transitory storage medium according to claim 7, wherein the verifying the unattended delivery location includes comparing the information on the designated specific position and an image captured by using a camera of the vehicle that is configured to image surroundings of the vehicle.

10. The non-transitory storage medium according to claim 6, wherein:

the designation information includes coordinate information designated by an input operation of the user on an application installed in a terminal device of the user; and the verifying the unattended delivery location includes comparing the designated coordinate information and position information of the vehicle that is acquired by using a GPS receiver of the vehicle that is configured to acquire the position information.

11. An information processing device communicably connected to a vehicle configured to autonomously deliver a package, the information processing device comprising a processor configured to:

acquire designation information generated along with designation by a user about an unattended delivery location for delivery of the package, the designation information includes uniform resource locator information readable from a two-dimensional code arrange at the unattended delivery location by the user, and arrangement information indicating a specific arrangement location of the two-dimensional code and readable from the two-dimensional code;

verify the unattended delivery location by comparing the uniform resource locator information and registered uniform resource locator information that is preregistered when designating the unattended delivery location and is associated with the two-dimensional code;

identify the unattended delivery location designated by the user by verifying the unattended delivery location;

control the vehicle to autonomously deliver the package to the unattended delivery location designated by the user when the unattended delivery location is identified; and when the processor determines that a position of the two-dimensional code does not agree with a position indicated by the arrangement information, control the vehicle to autonomously bring the package back without leaving the package.

12. The information processing device according to claim 11, wherein the designation information includes information on a specific position designated by an input operation of the user in an image on an application installed in a terminal device of the user.

13. The information processing device according to claim 11, wherein the designation information includes information on a specific position designated by an input operation of the user in an image captured by a terminal device of the user.

14. The information processing device according to claim 12, wherein the processor is configured to verify the unattended delivery location by comparing the information on the designated specific position and an image captured by using a camera of the vehicle that is configured to image surroundings of the vehicle.

15. The information processing device according to claim 11, wherein:

the designation information includes coordinate information designated by an input operation of the user on an application installed in a terminal device of the user; and the processor is configured to verify the unattended delivery location by comparing the designated coordinate information and position information of the vehicle that is acquired by using a GPS receiver of the vehicle that is configured to acquire the position information.

\* \* \* \* \*